(12) United States Patent
Balasubramanian

(10) Patent No.: US 11,979,299 B2
(45) Date of Patent: May 7, 2024

(54) METHOD AND APPARATUS FOR QED FOR PRIVATE ENTERPRISE NETWORKS

(71) Applicant: Celona, Inc., Campbell, CA (US)

(72) Inventor: Srinivasan Balasubramanian, Balasubramanian, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 18/323,870

(22) Filed: May 25, 2023

(65) Prior Publication Data
US 2023/0412474 A1  Dec. 21, 2023

Related U.S. Application Data

(60) Provisional application No. 63/351,121, filed on Jun. 10, 2022.

(51) Int. Cl.
*H04L 41/5009*  (2022.01)
*H04L 47/2491*  (2022.01)

(52) U.S. Cl.
CPC ...... *H04L 41/5009* (2013.01); *H04L 47/2491* (2013.01); *H04L 41/5012* (2013.01)

(58) Field of Classification Search
CPC ............. H04L 41/5009; H04L 41/5012; H04L 41/5019; H04L 41/5029; H04L 4/5032; H04L 4147/2491; H04L 47/29; H04L 41/267; H04L 41/34
USPC ................................. 709/220, 224, 227, 228
See application file for complete search history.

(56) References Cited

U.S. PATENT DOCUMENTS

| 10,673,503 | B2 * | 6/2020 | Agrawal | H04B 7/0632 |
| 2013/0035581 | A1 * | 2/2013 | Vesto | G16H 10/60 |
| | | | | 600/407 |
| 2013/0173719 | A1 * | 7/2013 | Ahmed | G06F 9/541 |
| | | | | 709/206 |
| 2014/0324766 | A1 * | 10/2014 | Alboszta | G06N 10/00 |
| | | | | 706/57 |
| 2016/0004972 | A1 * | 1/2016 | Alboszta | G06N 7/01 |
| | | | | 706/52 |
| 2019/0067264 | A1 * | 2/2019 | Fujiwara | G11C 7/18 |

(Continued)

FOREIGN PATENT DOCUMENTS

CN    114590095 A  *  6/2022

*Primary Examiner* — Khanh Q Dinh
(74) *Attorney, Agent, or Firm* — JAQUEZ LAND GREENHAUS & McFARLAND LLP; Bruce W. Greenhaus, Esq.

(57) ABSTRACT

A method and apparatus is disclosed that provides improved techniques and metrics used to improve the "Quality of Experience Delivered" ("QED") for use in Private Enterprise networks. The method and apparatus provides normalized metrics used for assessing all service types for performance. Focus is placed on latent scores and allowing for a range of acceptable operational scores. Observation points are identified and metrics collection is performed at the ingress and egress points for functional/application/node/service levels. Assessment based on packet sizes groups is enabled, rather than as an aggregate for better understanding of the tunability of the application layer for improved service. Burstiness of the traffic is gauged to allow for improved scheduling in the RAN. Individual deployments are adapted to assess ΔG and assess ΔS and ΔV for end-to-end performance management.

1 Claim, 17 Drawing Sheets

1300

(56) References Cited

U.S. PATENT DOCUMENTS

| | | | |
|---|---|---|---|
| 2020/0034736 A1* | 1/2020 | Mueller | G06N 10/00 |
| 2021/0090212 A1* | 3/2021 | Piat | G06T 3/0068 |
| 2021/0166444 A1* | 6/2021 | Lee | G06T 11/005 |
| 2022/0247651 A1* | 8/2022 | Kerpez | H04L 43/065 |
| 2022/0273206 A1* | 9/2022 | Dove | A61B 5/14551 |
| 2022/0273266 A1* | 9/2022 | Yonemori | G06F 3/04845 |

* cited by examiner

300

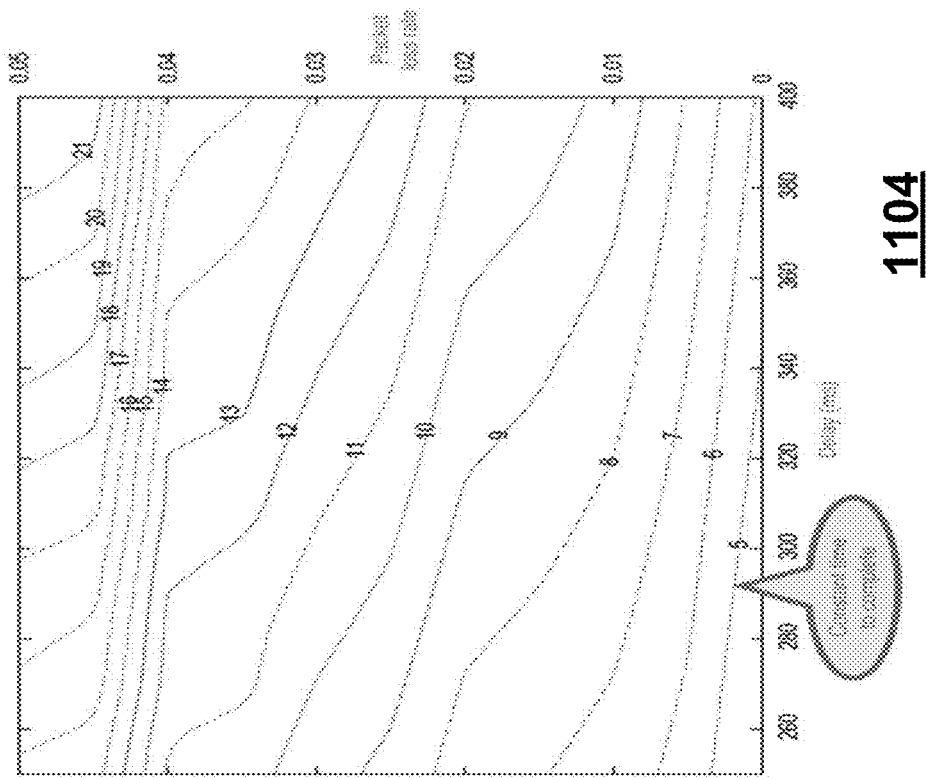
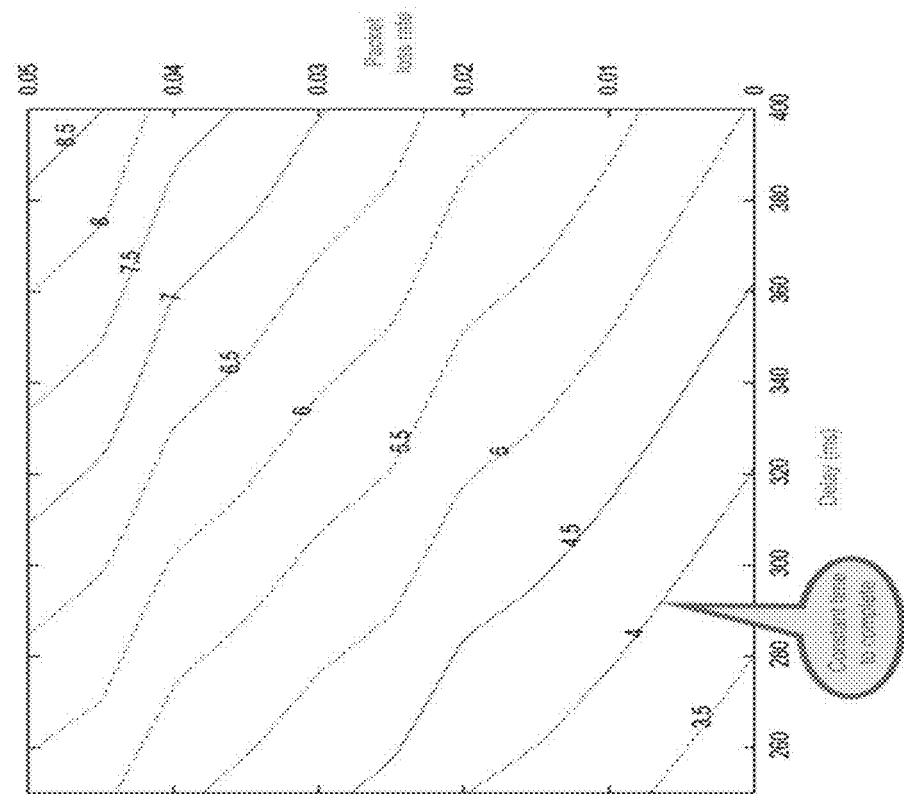
FIG. 11B
FIG. 11A

1300

METHOD AND APPARATUS FOR QED FOR PRIVATE ENTERPRISE NETWORKS

CLAIM OF PRIORITY TO PREVIOUSLY FILED PROVISIONAL APPLICATION—INCORPORATION BY REFERENCE

This non-provisional application claims priority to an earlier-filed provisional application No. 63/351,121 filed Jun. 10, 2022, entitled "Method and Apparatus for QED for Private Enterprise Networks" and the provisional application No. 63/351,121 filed Jun. 10, 2022, and all its contents, are hereby incorporated by reference herein as if set forth in full.

BACKGROUND

(1) Technical Field

The disclosed methods and apparatus relate generally to providing improved techniques and metrics used to improve the Quality of Experience Delivered ("QED") for use in Private Enterprise networks, and more particularly relate to disclosed methods and apparatus delivering a vastly improved broadband user experience covering Quality Attenuation and IP Capacity Metrics and Measurements.

(2) Background

It is important to recognize that not all bandwidth in a wireless communications network is created equally. For example: Queueing/buffering: 50 Mbit/s on an empty network is NOT the same as 50 Mbit/s on a loaded network. Similarly, with regard to Serialization delay: 50 Mbit/s on a 100 Mbit/s Ethernet port is NOT the same as 50 Mbit/s on a 10 Gbit/s port. $1/10^{th}$ of 100 Mbit/s is NOT the same as 10 Mbit/s. When it comes to "Physical Layer Consistency": 50 Mbit/s VDSL Network is NOT the same as 50 Mbit/s on 4G or GPON. So it is possible that "Bandwidth" measurements are an increasingly weak proxy for the application outcomes that customers value in wireless communication networks.
BBF QED Introduction The presently disclosed methods and apparatus propose to "Deliver a vastly improved broadband user experience" with two new specifications nearing completion. This covers Quality Attenuation and IP Capacity Metrics and Measurements. This will enable operators to achieve enhanced network performance by moving away from the conventional metric of capacity or "speed," in favor of real-time monitoring of network performance and operation. These measurements look beyond conventional measurements to improve the overall broadband experience and improve management of network latency, consistency, predictability and reliability. Operators can no longer differentiate on capacity alone, and instead must look to also measure and manage the reliability, network responsiveness, consistency and predictability of the services offered.

White papers are available from BBF Access and Transport Architecture (ATA) by Performance, Experience and Application Testing (PEAT) Project Stream. One such paper is entitled "Motivation for Quality Verified Broadband Services (Broadband QED)" (MR-452.1). This describes the motivation for Broadband Forum's work on quality-based broadband delivery with a specific focus on a measurement and analysis framework known as Quality Attenuation. This will enable a high-fidelity analysis to allow operators to gain greater understanding of network performance which, in turn, can help them focus their resources in the design and operation of their networks to improve overall customer experience.

Another white paper is entitled "Maximum IP-Layer Capacity Metric and Measurement" (MR-471.1) This white paper looks at Transmission Control Protocol (TCP) in measuring connectivity capacity and the issues it introduces, in particular, measuring connectivity at 1 gigabit/sec and above. Up until recently, TCP was the basis for capacity testing and is used in a number of commercially available "speed tests". It also describes the motivation behind using User Datagram Protocol (UDP)-based IP Capacity metrics and measurement methods. According to the white paper, the new Maximum IP-Layer Capacity Metric and Method(s) of Measurement based on UDP closes the gap between actual service rates and TCP's underestimations, removing the issues noted.

The new metrics and measurement method can measure the new Gigabit services and beyond without the artifacts of TCP performance, such as its throughput sensitivity to packet loss, round-trip time and its flow control details," said Al Morton, Lead Member of Technical Staff at AT&T. "In addition, it measures other important performance metrics beyond speed."

Some specifications are set forth in the following documents: "Quality Attenuation Architecture and Requirements" (WT-452.1); and "Maximum IP-Layer Capacity Metric, Related Metrics, and Measurements" (WT-471). As described therein, the specifications look beyond conventional measurements to improve the overall broadband experience and improve management of network latency, consistency, predictability, and reliability. Some background materials can be found at the following two websites: https://wiki.broadband-forum.org/display/BBF/Access+and+Transport+Architecture; and https://www.broadband-forum.org/open-broadband/broadband-experience.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIGS. 11A and 11B show two plots of the HTTP Median time to Complete and the HTTP 95$^{th}$ percentile time to Complete.

Figure 1:
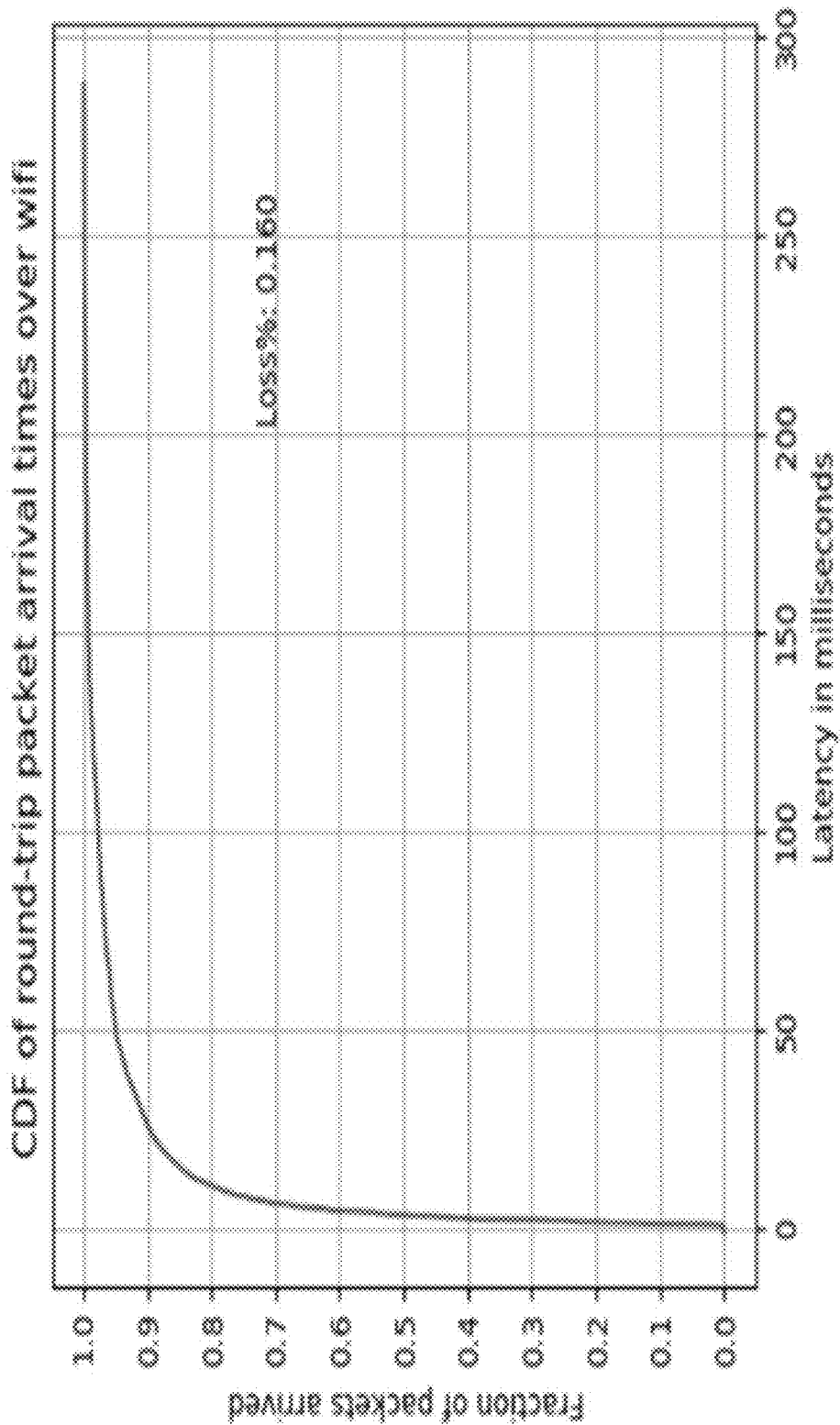
FIG. 1 shows a graph of "Latency in milliseconds" (along the x-axis), vs a "fraction of packets arrived" along the y-axis of the graph.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed methods and apparatus relate generally to providing improved techniques and metrics used to improve the "Quality of Experience Delivered" ("QED") for use in Private Enterprise networks, and more particularly relate to disclosed methods and apparatus delivering a vastly improved broadband user experience covering Quality Attenuation and IP Capacity Metrics and Measurements. Some aspects of the presently disclosed methods and apparatus include, but are not limited to, the following: (1) Normalized metrics used for assessing all service types for performance; Focus on latent scores and allowing for a range of acceptable operational scores; (2) Identifying observation points and metrics collection at the ingress and egress points for functional/application/node/service levels; (3) Enabling assessment based on packet sizes groups rather than as an aggregate for better understanding of the tunability of the application layer for improved service; (4) Gauge the burstiness of the traffic allowing for improved scheduling in the RAN; and (5) Adapting to individual deployments to assess ΔG and assess ΔS and ΔV for end-to-end performance management.

Examples of Use Cases—one example use case is provided by a security camera video feed and AGV support. In such a use, MBR/GBR setting is fixed. The application feed is provided by an adaptive video codec rate and inherently confined to tuned values of MBR/GBR. It is well known that AGVs have bursty packet that are typically have control information that have low latency requirements. The bearers are again defined with MBR/GBR.

GBR/MBR remains fixed; however, the application throughput itself varies. This does not change the throughput served to the application. The throughput information can be collected for observation purposes. The only check that can be performed is if GBR/MBR limits are maintained. Disadvantageously, this does not provide any insight into the network operations. This criteria can be included in the SLA reporting but is trivial.

Bandwidth-Delay-Product (BDP) is what is typically measured. Once a packet arrives in the queue, the only controllable variable from the network performance is the delay in packet delivery by the enterprise network. Monitoring packet delays and in particular associating with clustered packet sizes allows for implicitly measuring the BDP and additionally provides better insights into the operations of the network.

This measured delay metric, interpreted together with congestion levels (number of users, QCI flows, . . . ) on the network, provide a manageable view into the operations of the network and hence debuggability. SLA representation can be provided with associated throughput numbers, but whether the SLA is met is interpreted based on the delays measured.

Detailed Description of the QED Framework—

The QED Framework is Mathematical framework for accurately measuring network quality. It has been standardized through the Broadband Forum. Using a QED Framework, one is able to statistically combine all dimensions of network quality independent of technology making the network optimizable. The QED Framework disclosed herein provides a method for mapping network quality to QoS requirement. In addition, a unified test procedure and method for root cause analysis is defined developed from the test results.

Methodology—In some embodiments of the present methods and apparatus, Network quality always decreases over the different hops in the network. According to some embodiments, the methodology Measures the quality attenuation, probability of packet loss, and latency distribution, at a given load. The goal is to capture the network quality in a single distribution; Perfect is '0', not infinity. The metrics are viewed as geographical latency, serialization delay, and variability data. According to some of the disclosed methods and apparatus, measurements are obtained at different observation points in the network. In some embodiments, signatures are recognized that are indicative of typical network problems.

FIG. 1 shows a graph of "Latency in milliseconds" (along the x axis), vs a "fraction of packets arrived" along the y axis of the graph. The graph shows an example of a CDF (cumulative distribution function) of round-trip packet arrival times over wi-fi, wherein the "Loss % is equal to 0.160.

In accordance with other aspects of the present methods and apparatus, the QED Framework measures Network Quality as a distribution of latency at certain loads. Packet loss=∞ latency; implicitly captured in the latency view. In some embodiments, QoS requirements are defined for services as QTA—Qualitative Time Agreements. Meeting QTA implies that with statistical significance, the network does not impair user experience. Not meeting QTA, on the other hand, allows us to calculate the probability of poor user experience caused by network.

Figure 2:
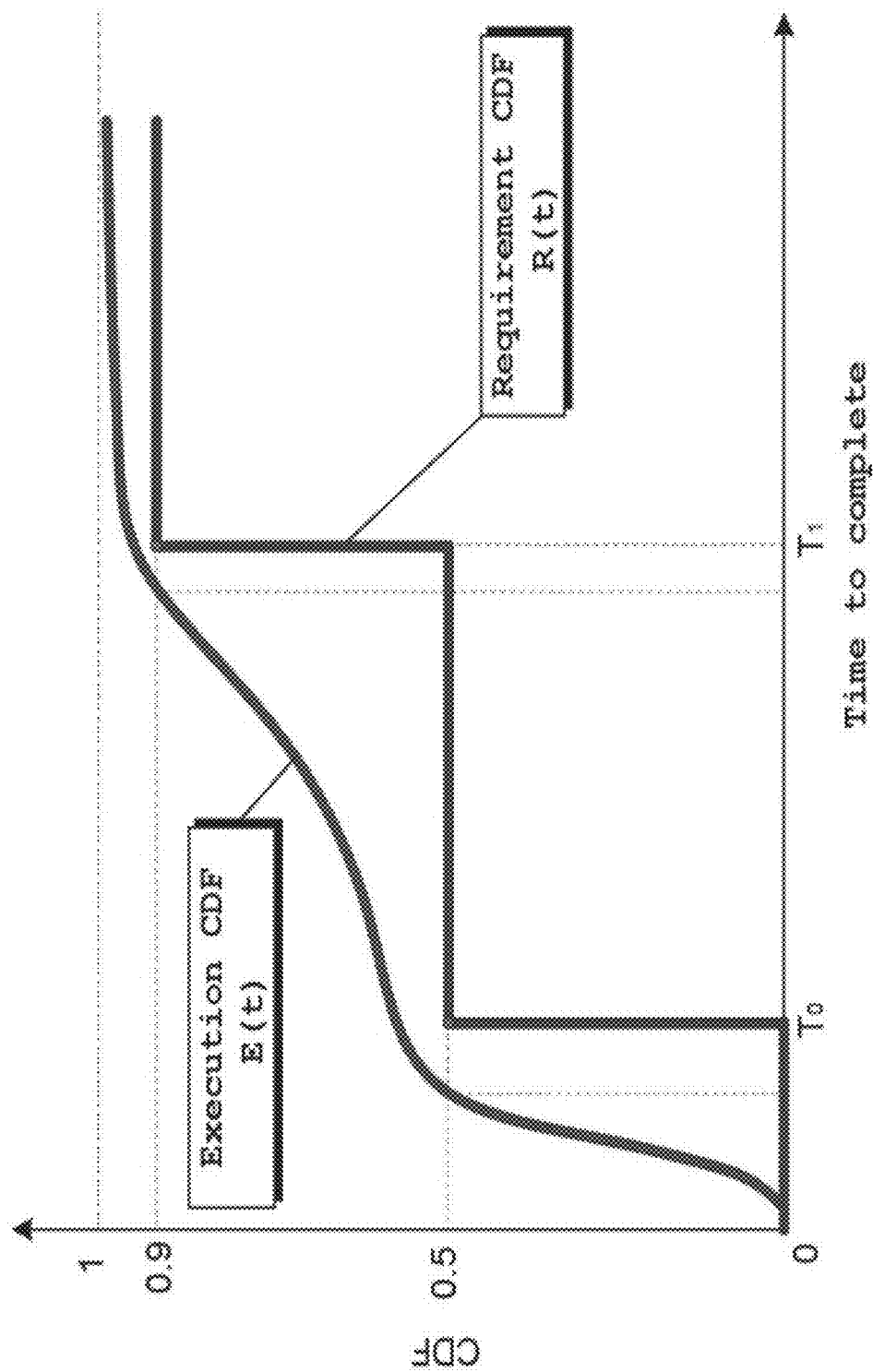
FIG. 2 is a graph of Time to complete (along the x-axis) and CDF (along the y-axis).

FIG. 2 is a graph of Time to complete (along the x-axis) and CDF (along the y-axis). As can be seen by viewing FIG. 2, different plots are shown in FIG. 2 showing "Execution CDF E(t)" and "Requirement CDF R(t)".

Figure 3:
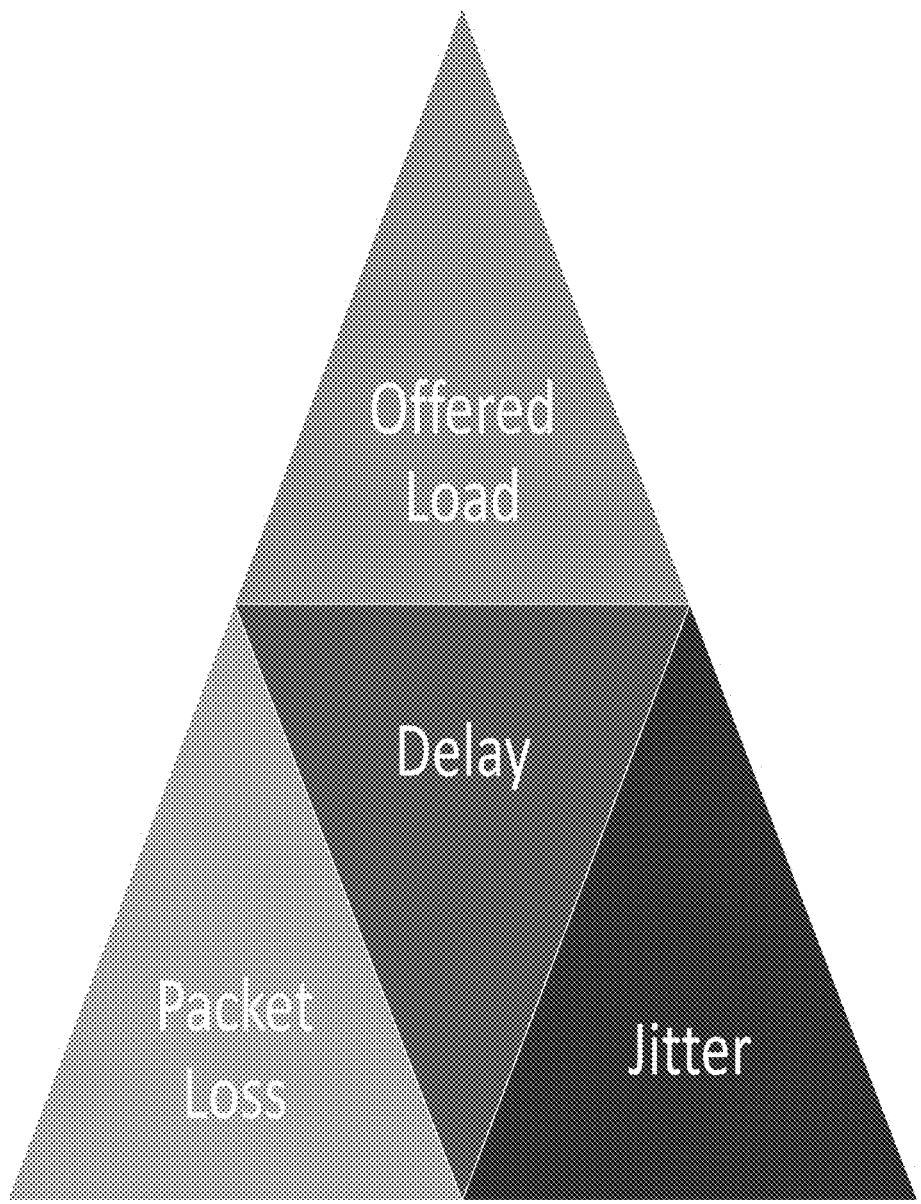
FIG. 3 shows a pyramid structure showing offered load, delay, packet loss and jitter as forming the pyramid.

Three degrees of freedom—FIG. 3 shows a pyramid structure showing offered load, delay, packet loss and jitter, formed as a pyramid. The offered load is a measure of traffic in a queue. The offered load is given by Little's law: the arrival rate into the queue (symbolized with k) multiplied by the mean holding time (symbolized by T), equals the average amount of time spent by items in the queue. "Insufficient bandwidth" implies: "At the offered load, the resulting packet loss/delay/jitter exceeds the acceptable performance bounds of the user's application".

Network Performance—Criteria include: response time, throughput (b/s) and normalized throughput. Normalization for a given flow can done based on MBR/GBR. Normalization for aggregate throughput can be done relative to the peak link capacity.

$S=R/C$ where;

R=Average error free b/s passing through a reference point in the network; and

S=% time the network is carrying error free packets.

Channel (or link) utilization is the % time the channel (or link) is busy. Channel Efficiency is the % time the channel is carrying user information. Channel efficiency=S(D/(D+H)), where: D=#user data bits/packet; and H=#network overhead bits/packet.

Figure 4:
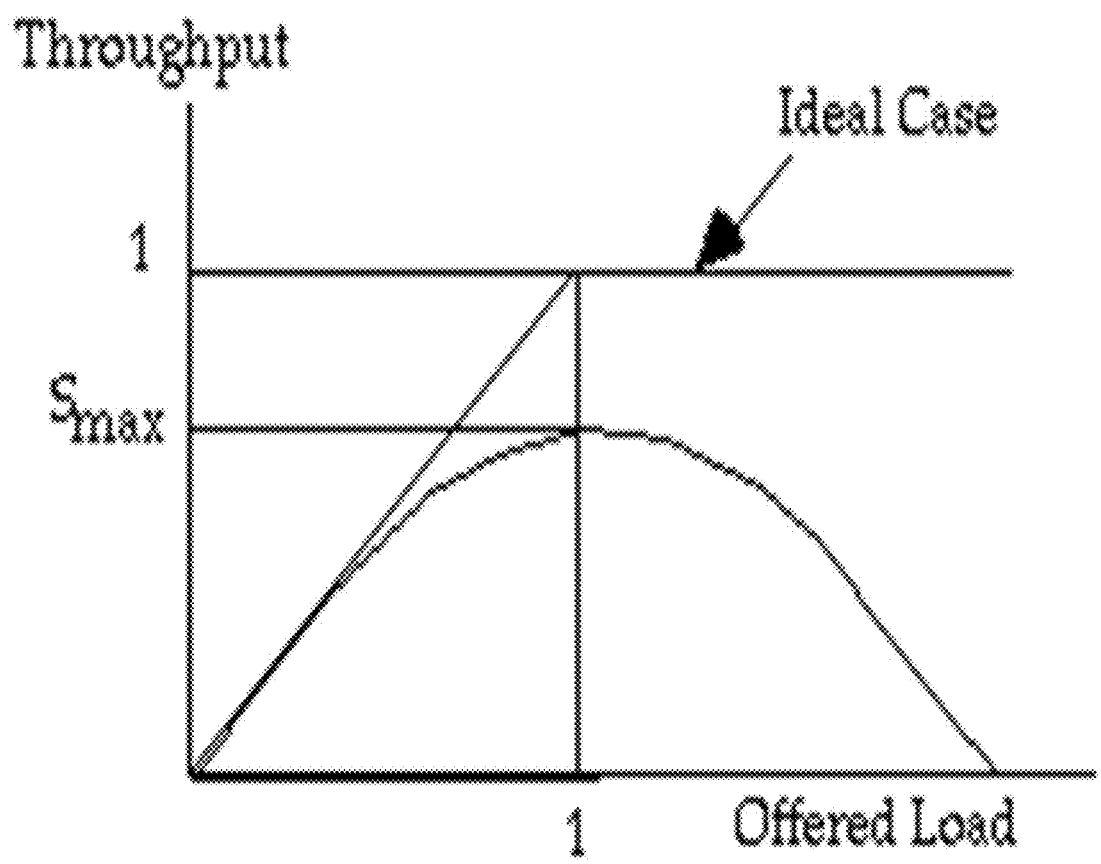
FIG. 4 shows a plot of throughput (along the y-axis) vs. Offered Load (along the x-axis).

Channel Capacity, Smax, is the maximum obtainable throughput over the entire range of input traffic intensities, i.e., the offered load. FIG. 4 shows a plot of throughput (along the y-axis) vs. Offered Load (along the x-axis). An Ideal Case and Smax plots are also shown in FIG. 4.

Network Performance Perspectives—From a Network Performance Perspectives, User-Oriented, Network Manager, and Network designer/developer considerations may be observed and taken advantage of. For example, from a User-Oriented perspective, the following measurements are maintained: Minimum delay; Maximum throughput; Highly reliable; Very flexible and Secure. From a Network Manager perspective, the following factors are taken into consideration: Maximum throughput for all users; Effective congestion control; Easy management and Highly reliable. Finally, from a Network Designer/developer's perspective, the following factors are realized: Simple design; Robust; Scales; and Efficient use of resources, CPU, links and memory.

The next steps in developing the present methods and apparatus providing improved techniques and metrics used to improve the Quality of Experience Delivered ("QED") for use in Private Enterprise networks to determine increasing utility. The factors to be considered are "how much" Quality Bandwidth exists; what more can be done with the increase in bandwidth if available (functionality (e.g., synchronization support (for small-cell/mobile backhaul)), and finally a determination of how good the bandwidth is (quality (latency & consistency (stability, stationarity & reliability)).

Figure 5:
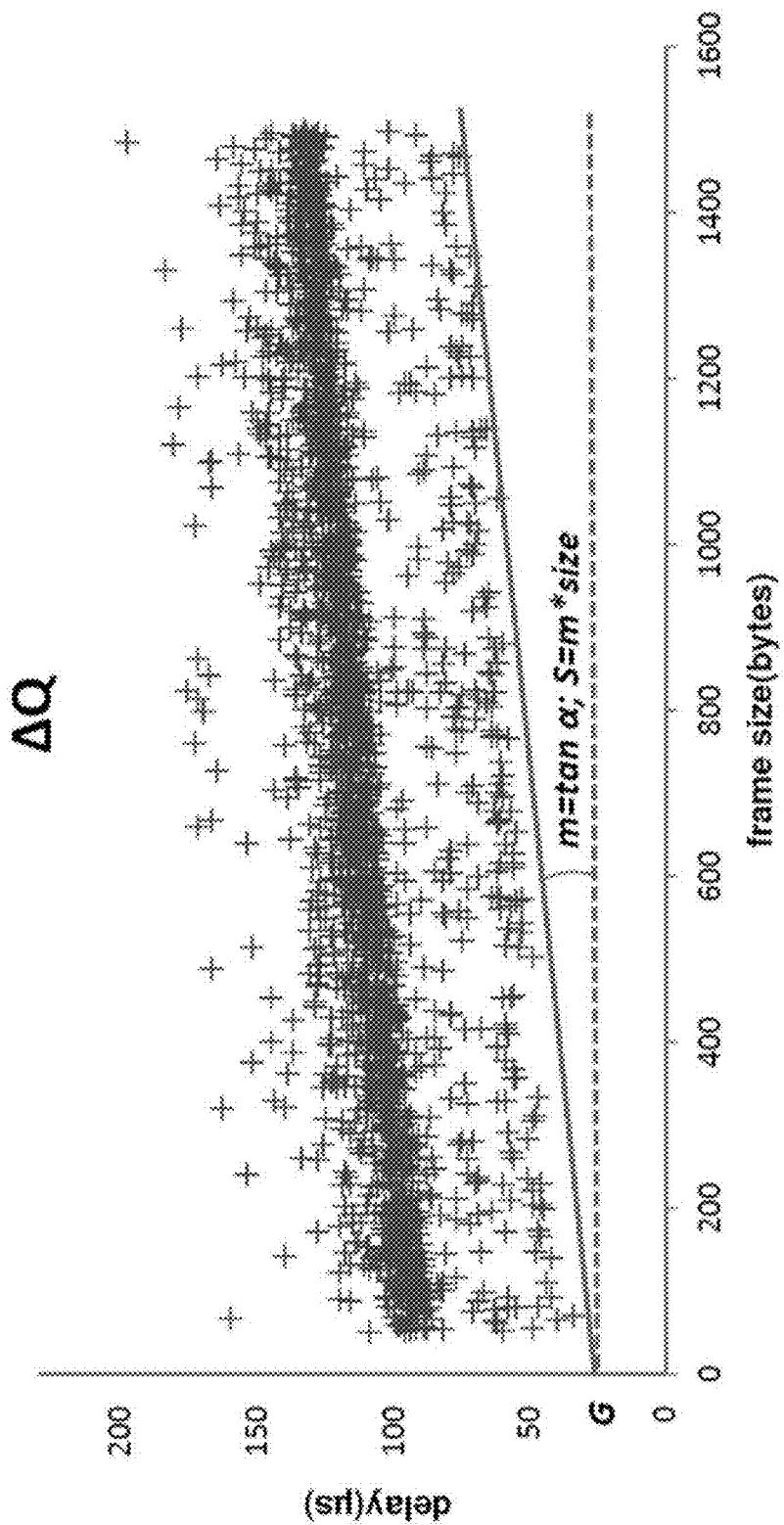
FIG. 5 shows a graph of delay measurement versus packet size (for an Ethernet switch).

FIG. 5 shows a graph of delay measurement versus packet size (for an Ethernet switch). Frame sizes (in bytes) are along the x-axis while delay measured in micro-seconds extend along the y axis.

Decomposing ΔQ—

Figure 6:
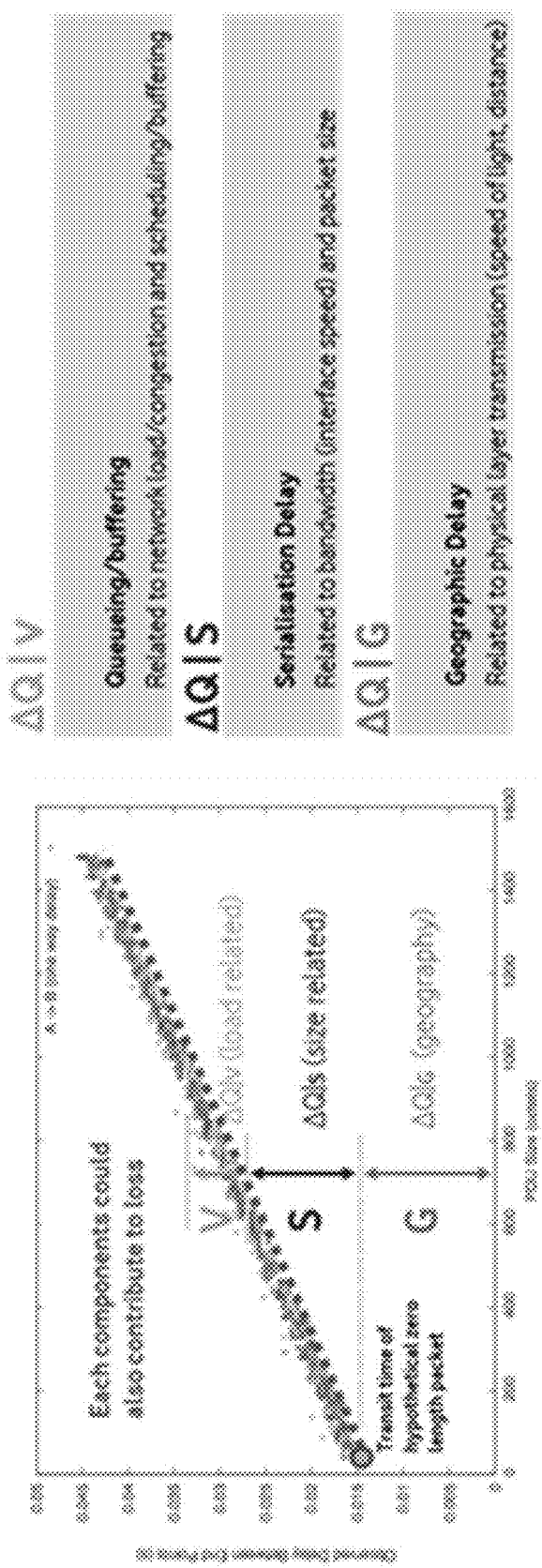
FIG. 6 shows one method of decomposing ΔQ.

FIG. 6 shows one method of decomposing ΔQ.

ΔQ incorporates both delay (a continuous variable) and exceptions/failures (discrete variables). Modelled mathematically using Improper Random Variables (IRVs), i.e., continuous random variables whose total probability (which we call the 'tangible mass') is less than one. The difference between the tangible mass and one we call the 'intangible mass', and use this to represent the probability of exception or failure.

If we write $\Delta Q(x)$ for the probability that an outcome occurs in a time $t \leq x$, then we define the tangible mass T by: $T(\Delta Q) = \lim_{x \to \infty} \Delta Q(x)$. This is also the zeroth central moment of the distribution.

Figure 7:
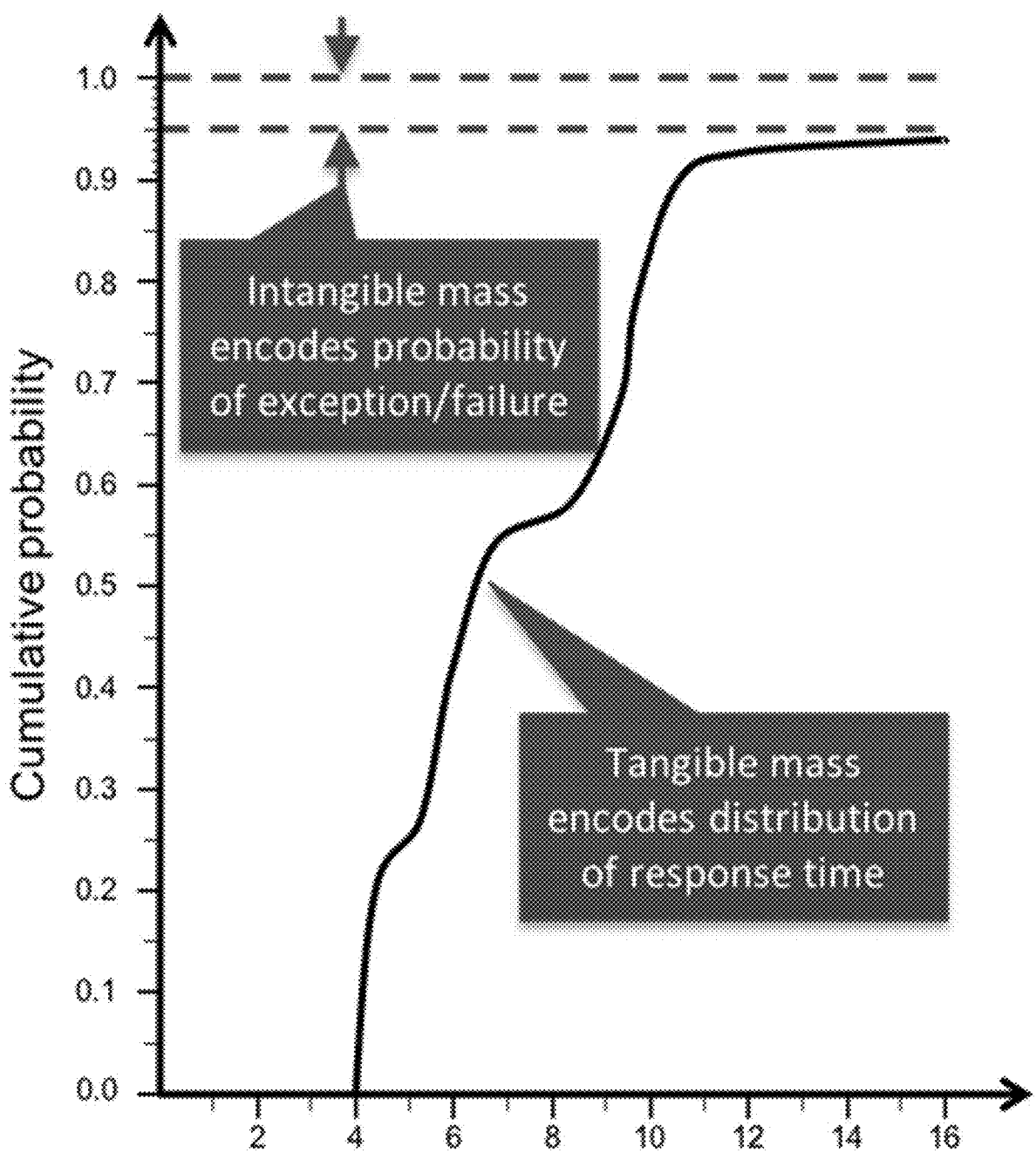
FIG. 7 shows further details of the method of decomposing ΔQ in which intangible and tangible mass encodes distribution.

FIG. 7 shows further details of the method of decomposing ΔQ in which intangible and tangible mass encodes distribution.

Intangible mass is the remaining probability, which is simply 1−T. 'Smaller' attenuation is the one that delivers a higher probability of completing the outcome in any given time $(\forall x\ \Delta Q1(xx) \leq \Delta Q2(xx)) \Rightarrow (\Delta Q1 \geq \Delta Q2)$. Compositionality of Quality Attenuation:

$$\Delta Q^{A \to Z} = \Delta Q^{A \to B} \oplus \Delta Q^{B \to C} \oplus \ldots \Delta Q^{Y \to Z}.$$

Figure 8:
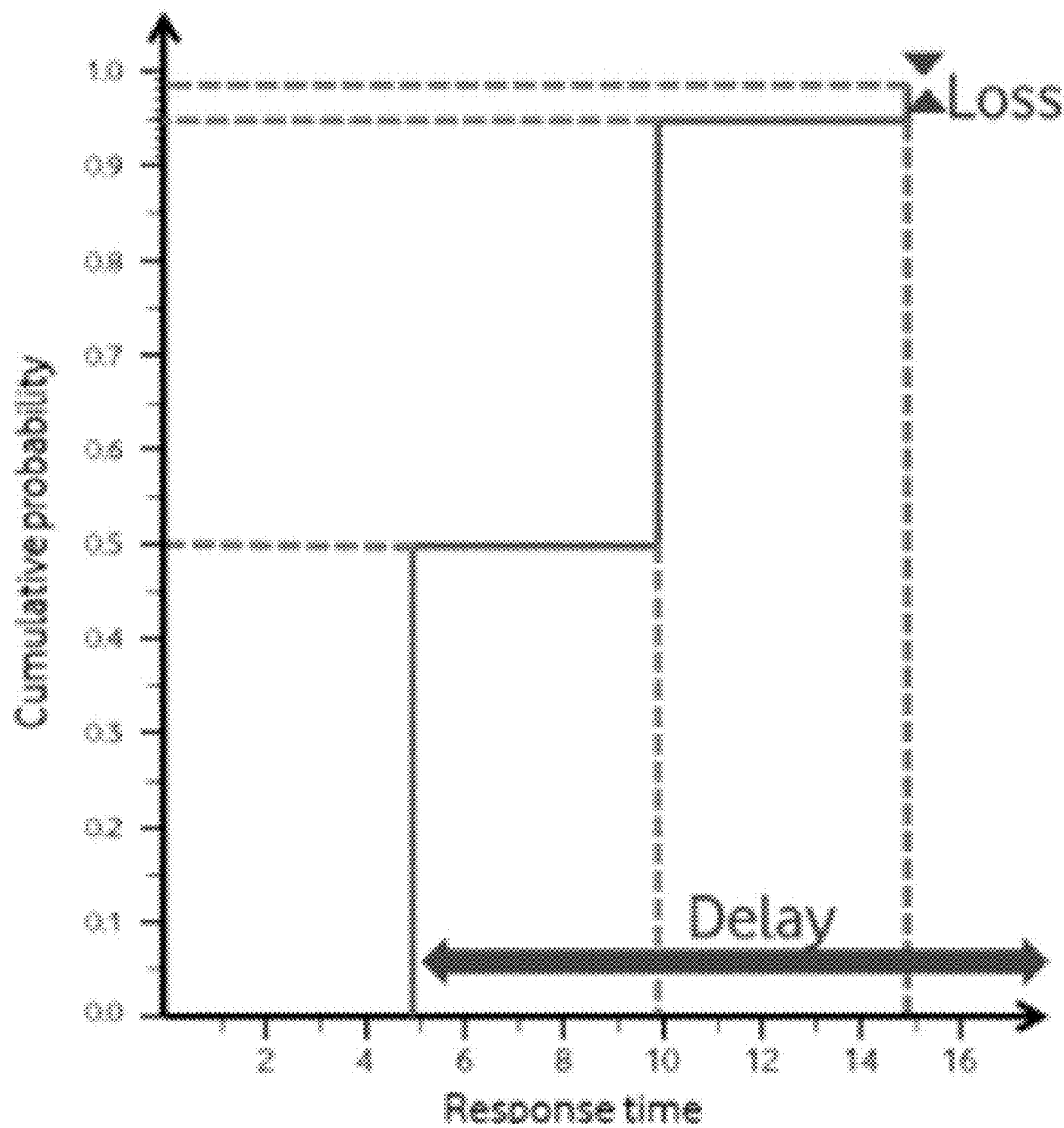
FIG. 8 shows the "Application of ΔQ definition.
Figure 9:
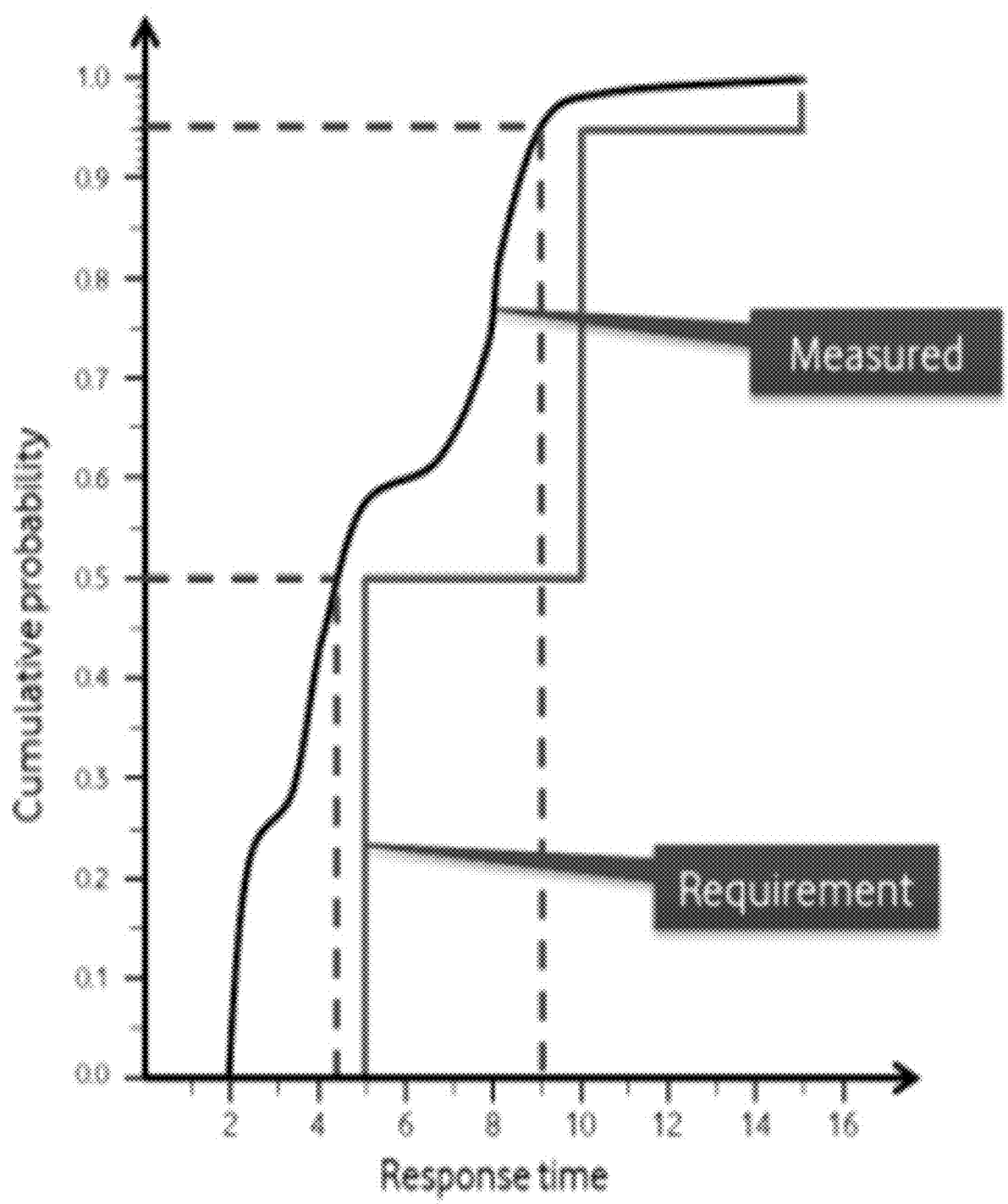
FIG. 9 shows measuring and comparing with the specified requirements.

FIG. 8 shows the "of ΔQ definition. In the plot shown in FIG. 8, application requirements are specified as network commitments. FIG. 9 shows measuring and comparing with the specified requirements.

QED—Additional Details

Additional details regarding the methods and apparatus for QED for private Enterprise Networks are now disclosed.

Introduction—A new framework for relating network and application performance called Quality Attenuation (written as ΔQ) is provided. This new framework for relating network and application performance allows for a much greater measurement fidelity of packet layer performance than simple min/average/max latency and jitter measurements.

ΔQ applications include the following: Root-cause analysis for network operations; Access technology performance characterization; Consumer broadband quality KPI and In-home network optimization.

Network services need to satisfy end-users' suitable criteria of: fitness-for-purpose; transparency; and fairness.

A broader framework for evaluating network performance: Firstly, this broader framework captures application-specific demands, in a way that is unbiased, objective, verifiable and adaptable to new applications as they appear. This is generally provided by ascertaining a demand profile; and encouraging OTT suppliers to produce applications imposing less stringent demands on the network. Secondly, a system of measurement for service delivery that could be unequivocally related to application needs (this would be necessary if one wished to know if a particular network service was fit-for-purpose with respect to a particular application); assist in dealing with the heterogeneous nature of the digital delivery chain and avoiding imposing unreasonable loads on the network.

The ΔQ for a round trip can be decomposed into separate constituent components, corresponding to various sources of performance degradation (packet loss/delay). These components are: related to structural aspects (architecture/design); network technology/dimensioning related (link speeds etc.); and network load/scheduling related.

The component elements of ΔQ are composable. That is, they are both additive within an individual link to give its resulting performance and can be accumulated along the end-to-end digital delivery chain (e.g., between a user device or a CPE and application server in the cloud data center). It is this mathematical tractability that makes the technique a powerful tool for reasoning about systems (network) performance and facilitates "performance by design".

Definitions—For purposes of the disclosed methods and apparatus, the following definitions are set forth:

Quality Attenuation ΔQ—is a statistical measure that combines both the distribution of outcome completion time (e.g., packet latency) and the probability of outcome failure (e.g., packet loss).

Translocation—The process of making information present at one location available at another.

Quality of Experience (QoE)—Is the overall performance at the services/application level from the user's perspective.

And Quality of Service (QoS)—Quality of Service ((QoS) refers to a set of technologies (QoS mechanisms) that improve performance at the packet level from the network perspective.

Introduction to Quality Attenuation—There is always some delay and some chance of failure, hence some 'attenuation' of quality in broadband networks:

Typical network measures treat packet delay and packet loss as entirely separate.

However, from the perspective of an application there is often a level of delay after which a delivered packet is useless, and therefore effectively lost.

Thus, it is beneficial to combine loss and delay together into a single measure of "Quality Attenuation".

Quality attenuation is a function of the load on the network, which in turn depends on the traffic pattern of the data entering the network.

Quality Attenuation (as noted above, which may be written as "$\Delta Q$") is therefore a statistical measure that combines both the distribution of outcome completion time (e.g., packet latency) and probability of outcome failure (e.g., packet loss) that can be used as a unified metric.

The approach taken in the past was to establish the following thresholds for each application of interest: Minimum bandwidth; Maximum latency; Maximum jitter and Maximum packet loss ratio. The assumption that "parameters within threshold=or having good QoE" can be overly simplistic for complex, loaded, dynamic systems. Individual network parameter thresholds are necessary but not sufficient to ensure good application outcomes and hence QoE. The combination of these parameters at any instant in time is important. A statistical measure of the attenuation of the translocation of a stream of packets when crossing a network must be sufficiently bounded for an application to deliver fit-for-purpose outcomes. Applications have only one thing to worry about with respect to the network: the impairment that its packet streams experience, $\Delta Q$.

Understanding the bounds on the end-to-end quality attenuation (loss and delay) incurred on the network helps to decompose it into 'budgets' for the various components (network domains) in the digital delivery chain from end-user/CPE to application server. It also helps in managing schedule-ability limits and not just network capacity limits. It can also measure operational slack with respect to each key application QoE. There is therefore a need for means of mapping objective network measurements and parameters to the subjective perception of application performance that is applicable to a whole range of applications, and not just optimized for one such as voice or video.

This is the role that $\Delta Q$ Quantitative Timeliness Agreements (QTAs) can play. For an application to work well, it needs a bound on the end-to-end delay and a bound on the end-to-end loss which means a bound on the $\Delta Q$ (for a given offered load); i.e., $\Delta Q$ is a universal application QoE proxy.

Figure 10:
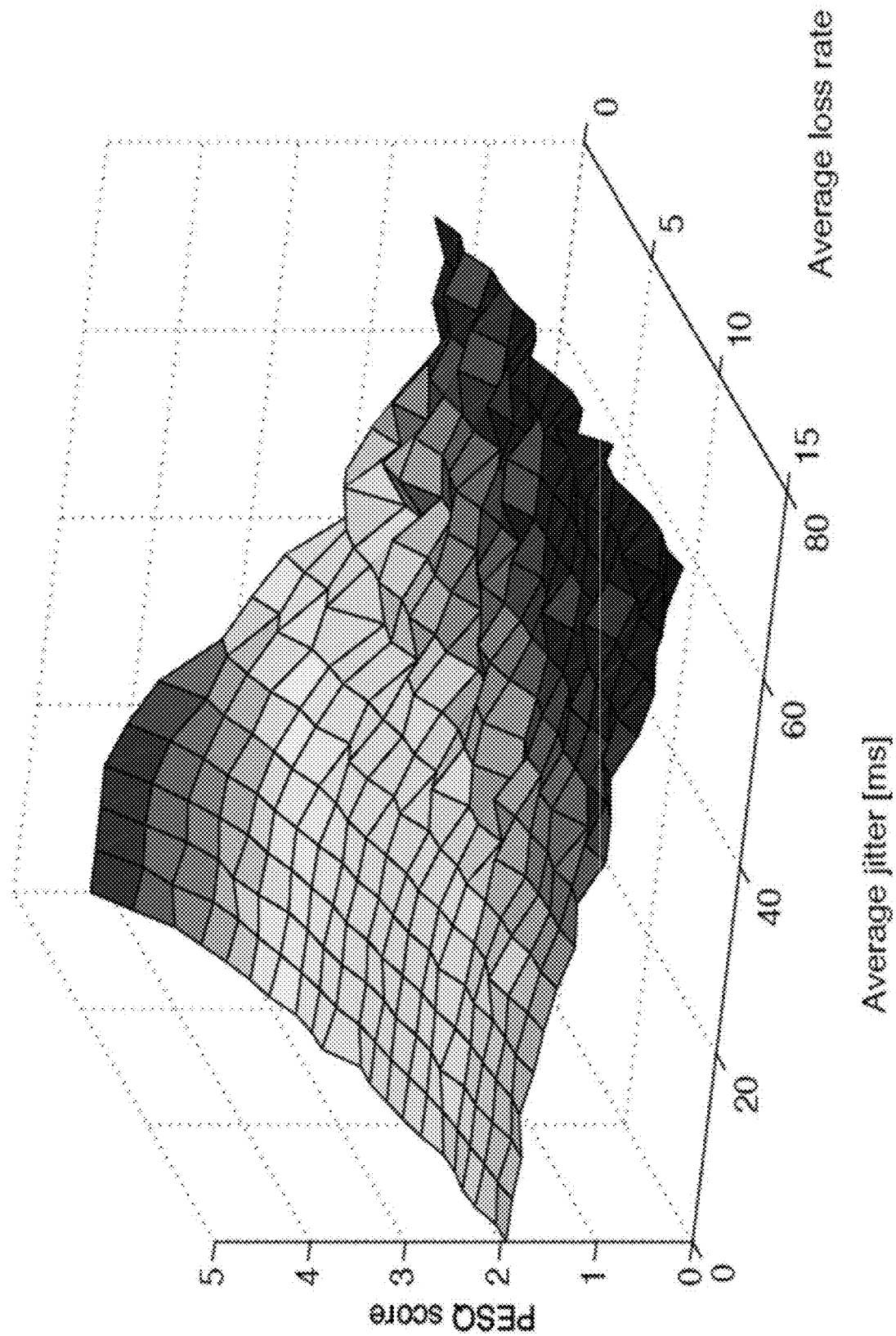
FIG. 10 shows a graph of an exemplary VoIP QoE surface taking into account factors such as PESQ scores, average jitter and average loss rates.

FIG. 10 shows a graph 600 of an exemplary VoIP QoE surface taking into account factors such as PESQ scores, average jitter and average loss rates.

FIGS. 11A and 11B show plots 1102, 1104, of the HTTP Median time to Complete (1102) and the HTTP $95^{th}$ percentile time to complete (1104). The two plots, 1102, 1104 show that there is "no quality in averages".

Decomposing $\Delta Q$ (Continued)—

$\Delta Q|G$: This is the distribution of inherent delay and probability of loss introduced by the path itself, which includes the time taken for signals to traverse it. It can be thought as the minimum time taken for a hypothetical zero-length packet to travel the path. In many cases this is effectively constant for relatively long periods of time, in which case it can be represented by a single delay value. For typical broadband networks, a convenient unit is ms. If characteristics of the path result in a baseline loss rate that is independent of packet size, this is included here.

$\Delta Q|S$: This distribution is that part of $\Delta Q$ that is a function of packet size and incorporates things like serialization and de-serialization time. $\Delta Q|S$ is a function from packet size to delay, which is usually monotonic and in many cases is broadly linear, in which case we can represent it by a simple slope parameter, with the dimensions of time/length. For current network interface speeds, a convenient unit is μs/byte. If characteristics of the path result in a baseline loss rate that depends on packet size, for example due to a constant probability of corruption of each byte, this is included here.

$\Delta Q|V$: This is the distribution of delay and loss introduced by the fact that the network is non-idle, therefore it is affected by any other packets on the system, including those generated by the same application and user. This is modelled as a random variable, whose distribution may vary by time of day, etc. This can typically not be reduced to a single number, although moments of the distribution can be useful. The zeroth moment is the total probability, whose difference from one represents loss; the first moment is the mean variable delay, measured in s; the second central moment is the variance, whose square root is the standard deviation, also measured in s. Loss that results from competition for shared finite resources such as interface packet buffering is included here.

The $\Delta Q_{A \rightarrow B}$ of the path (A,B) is characterized by a [G, S, V] tuple. The minimum delay value for each packet size can be approximated by a linear model, i.e., a straight line.

Delay Min (size)=m×size+G. Wherein G is the delay introduced by the network on a hypothetical zero length packet (no serialization delays etc.); i.e., it is the intercept on the y-axis of the regression line through the set of minimum delays per packet size.

S is the additional delay depending on the packet size and can be calculated from the packet size via the gradient m (which is the delay expressed as seconds per byte); i.e., S (size)=m×size.

The quantity below the linear regression line of minimum delay (per packet size) is the called the Structural Delay SD (i.e., G+S). V can be obtained by subtracting the SD from the scatter plot of $\Delta Q$ delay values, i.e., V (load)=$\Delta Q$ (size, load)−SD (size).

Figure 12:
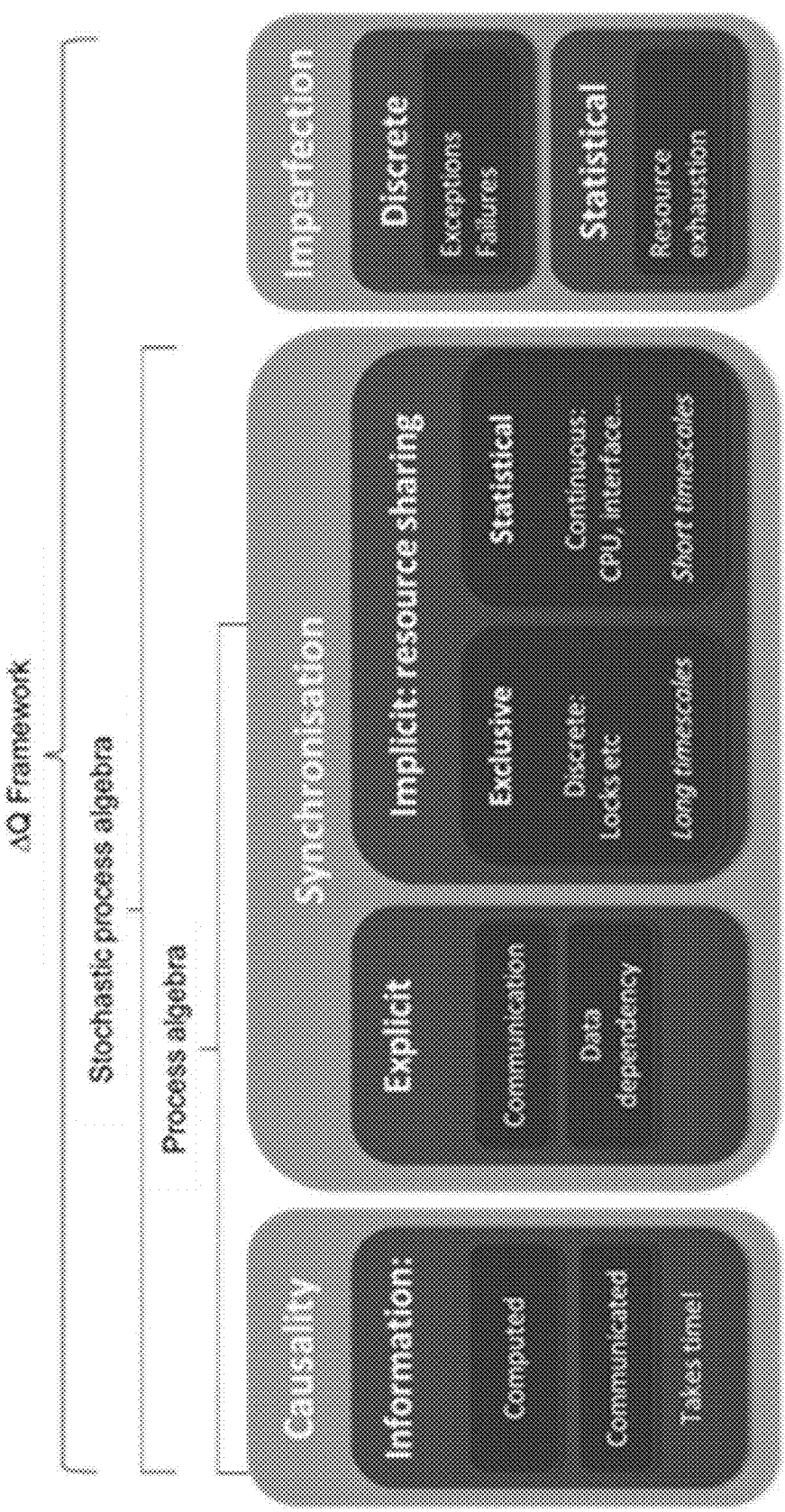
FIG. 12 shows quality attenuation and process algebra under a ΔQ framework in accordance with the presently disclosed methods and apparatus.

FIG. 12 shows quality attenuation and process algebra under a $\Delta Q$ framework in accordance with the presently disclosed methods and apparatus. The plot includes both stochastic process algebra and process algebra procedures. Causality, synchronization and imperfections are addressed as shown in FIG. 12.

Problems or Enhancement Addressed by the presently disclosed methods and apparatus for QED for Private Enterprise Networks are discussed below.

The presently disclosed methods and apparatus address practical ways to provide a minimal set of metrics to make an assessment of the relevant KPIs associated with SLO/SLA in order to accurately determine if the end-to-end bearers are met. The disclosed methods and apparatus also allow for determining hop-to-hop performance and assessing the end-to-end system performance for the individual microslices. Bottlenecks in the network are assessed and determined based on the time-of-day, day-of-week, service type that are facing issues requiring network replanning or possibly modifying the SLO/SLA that can be delivered from the network.

Figure 13:
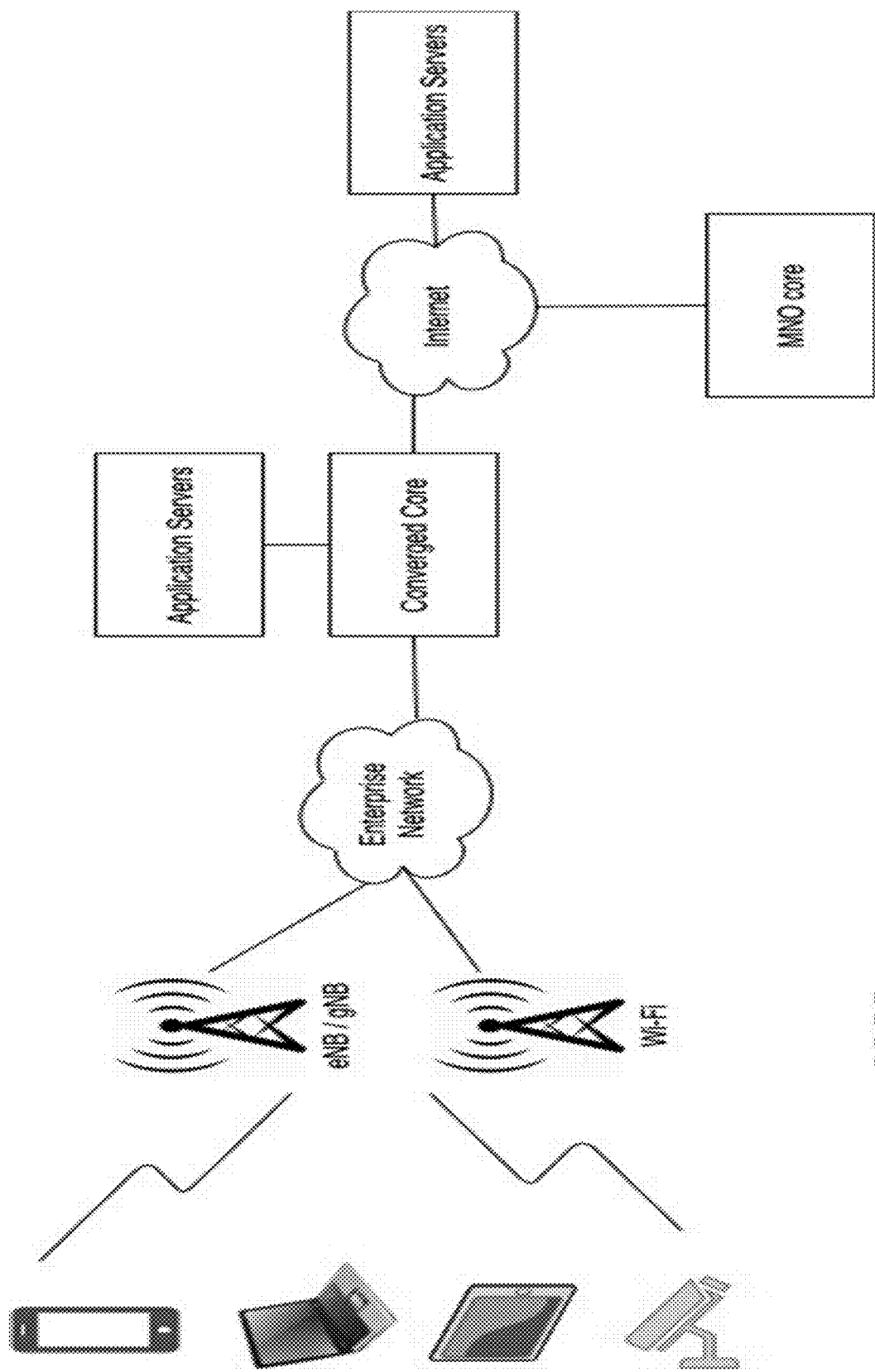
FIG. 13 shows an exemplary private wireless network that can take advantage of the presently disclosed methods and apparatus providing improved techniques and metrics used to improve the Quality of Experience Delivered ("QED") for use in Private Enterprise networks.

FIG. 13 shows an exemplary private wireless network 1300 that can take advantage of the presently disclosed methods and apparatus providing improved techniques and metrics used to improve the Quality of Experience Delivered ("QED") for use in Private Enterprise networks. Quality is Attenuated (i.e., packets are delayed/dropped) on the different hops in the network 1300. This results in a performance outcome of the network 1300 that a delta relative to an ideal network that has zero delay/zero loss.

Employing Quality Tests—

Bandwidth Model: One approach is the "bandwidth model" wherein the throughput information (scalar) is plotted. An average, maximum, and minimum (aggregate/per-flow) values can be determined.

Quality Model: Another approach is to use the "quality model" approach which shifts the plots from throughput to latency/loss (N-tuple). The Metrics used may include the following in some embodiments: Latency (Minimum, Average, Maximum); Jitter (Minimum, Average, Maximum); Absolute-Jitter (Minimum, Average, Maximum); and Dropped packets.

In such an approach, measurements are performed as "hop-to-hop" and "round-trip" measurements. Plots are associated with specific applications/application types. Plots are grouped as histograms of packet sizes. In some embodiments, plots are measured with units of time/time-of-day. Also, plots may be calculated at different OP (Observation Points). In some embodiments, plots are associated with the peak link capacity available.

Figure 14:
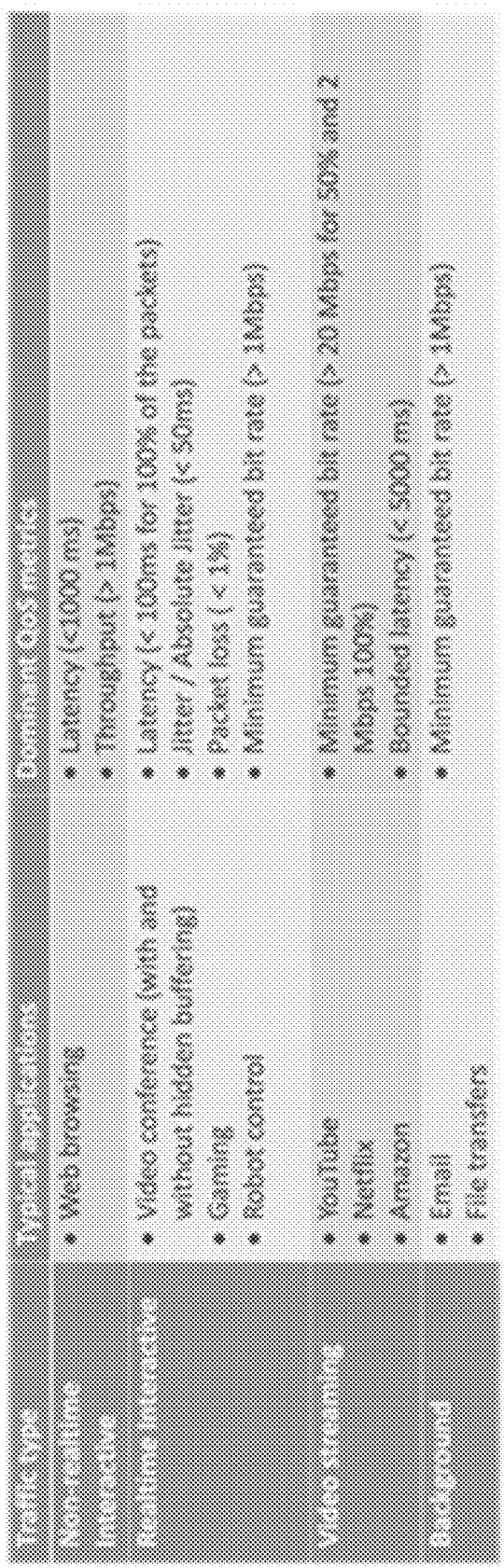
FIG. 14 shows data associated with different traffic types, typical applications, and their relevant QoS Metrics, as well as showing the relationship between particular types of traffic, particular applications and dominant QoS metrics associated with them.

FIG. 14 shows data associated with different traffic types, typical applications, and their relevant QoS Metrics, as well as showing the relationship between particular types of traffic, particular applications and dominant QoS metrics associated with them.

Figure 15:
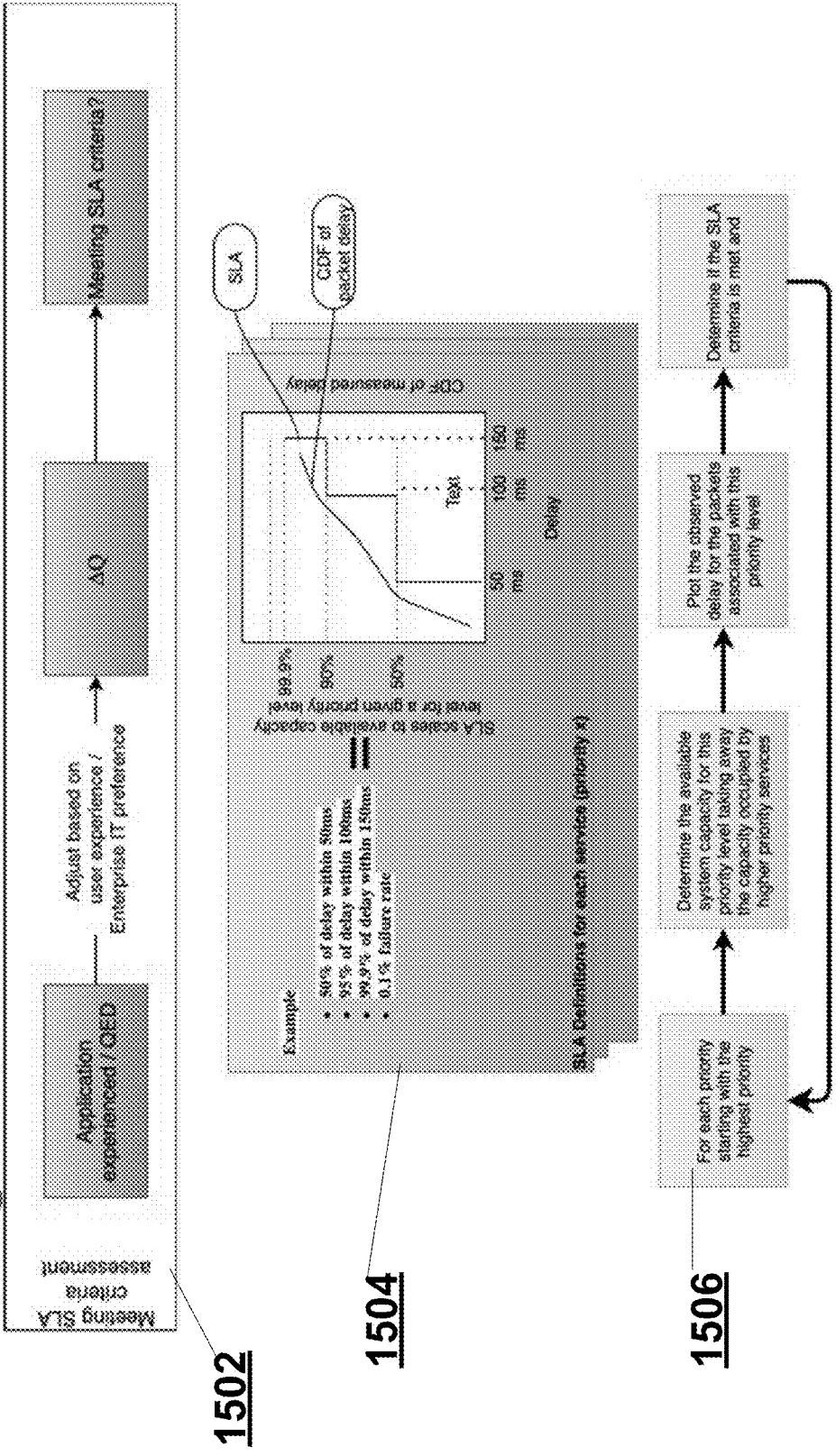
FIG. 15 shows flowcharts and plots used in determining whether SLA criteria assessment for services is met or is not met.

FIG. 15 shows flowcharts and plots used in determining whether SLA criteria assessment for services is met or is not met. For example, flowchart 1502 is used to determine whether SLA criteria assessments are being met. As shown in the flowchart 1502 of FIG. 15, the application experienced/QED is adjusted based on user experience/and Enterprise IT preferences. ΔQ value are reviewed to determine whether the SLA criteria is being met.

SLA definitions for each service (of priority x) are shown in functional block 1504. Flowchart 1506 shows another means for determining if the SLA criteria is met. As shown in flowchart 1506, for each priority starting with the highest priority, the flowchart determines the available system capacity for this priority level taking away the capacity occupied by higher priority services. The flowchart continues by using a plot to observe delay for packets associated with this priority level. The flowchart 1506 ends by determining if the SLA criteria is met.

Figure 16:
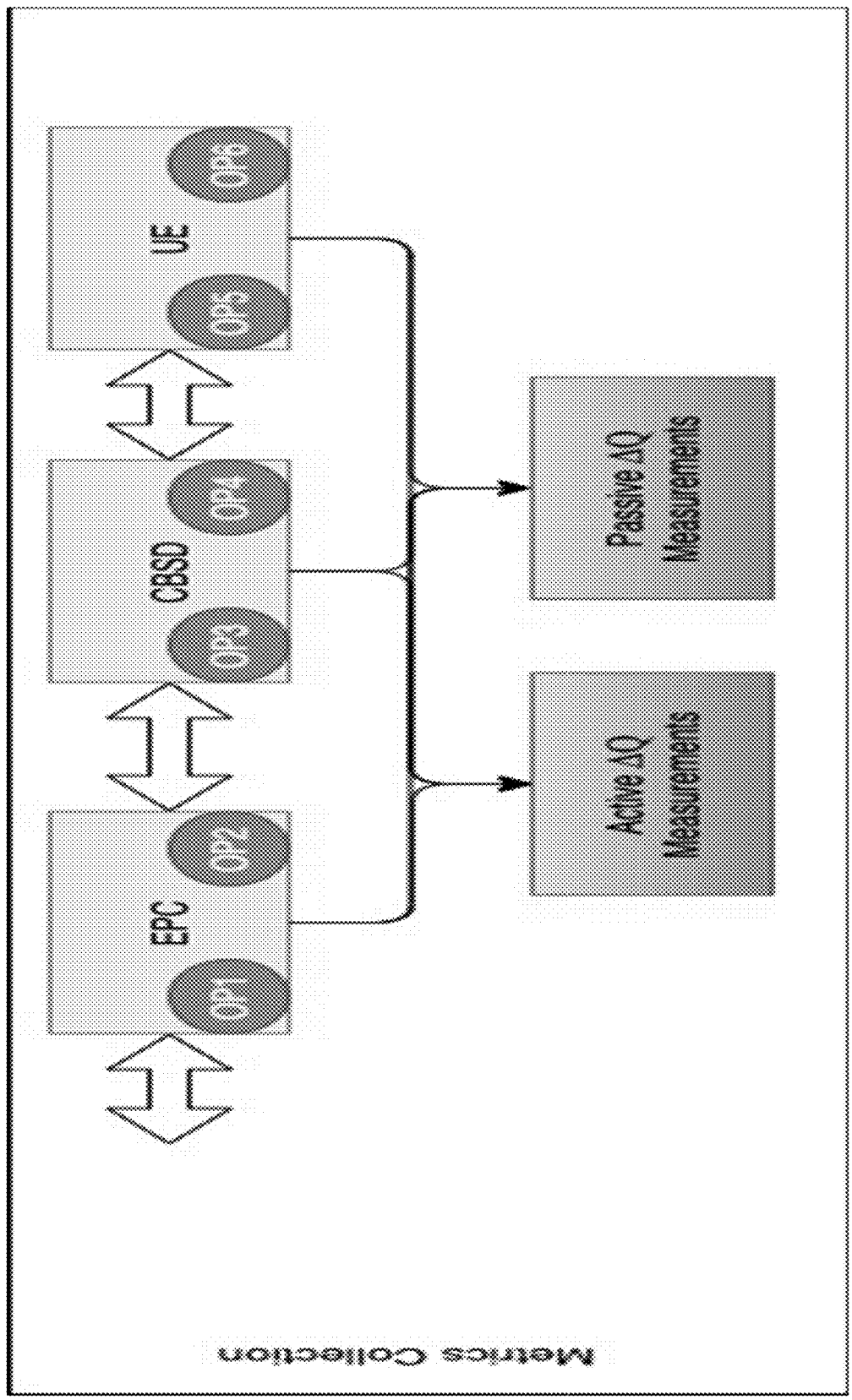
FIG. 16 shows a flowchart of processes used in connection with the assessment of Quality Attenuation.

FIG. 16 shows a flowchart of processes used in connection with the assessment of Quality Attenuation. The Quality Attenuation approach provides a means to take a bounded loss/delay approach of the industry specification TR-126 to the next level using a statistical measure of the attenuation of the translocation of a stream of packets when crossing a network. In some embodiments, this is sufficiently bounded for an application to deliver fit-for-purpose outcomes. The layering of network protocols isolates the application from any other aspect of the packet transport. FIG. 16 shows the many different Metrics observation points ("OPs") that may used with the present methods and apparatus. For example "OP1" is the UE-to-Edge metrics. Round trip performance between the UE and the edge of the enterprise network. "OP2": Edge-to-CBSD metric. This is the Traffic exchange between the EPC core and CBSD Control and data traffic. "OP3": Ingress point of CBSD metrics. It includes incoming and outgoing traffic from the CBSD. "OP4": RAN Scheduler metrics, which include in some embodiments Scheduler performance metrics. "OP5": UE modem performance metrics. This may include MDT, UE modem metrics collected via Celona Smartphone Apps.

"OP6": End user application performance metrics, which may include Objective application metrics measured at the UE.

Figure 17:
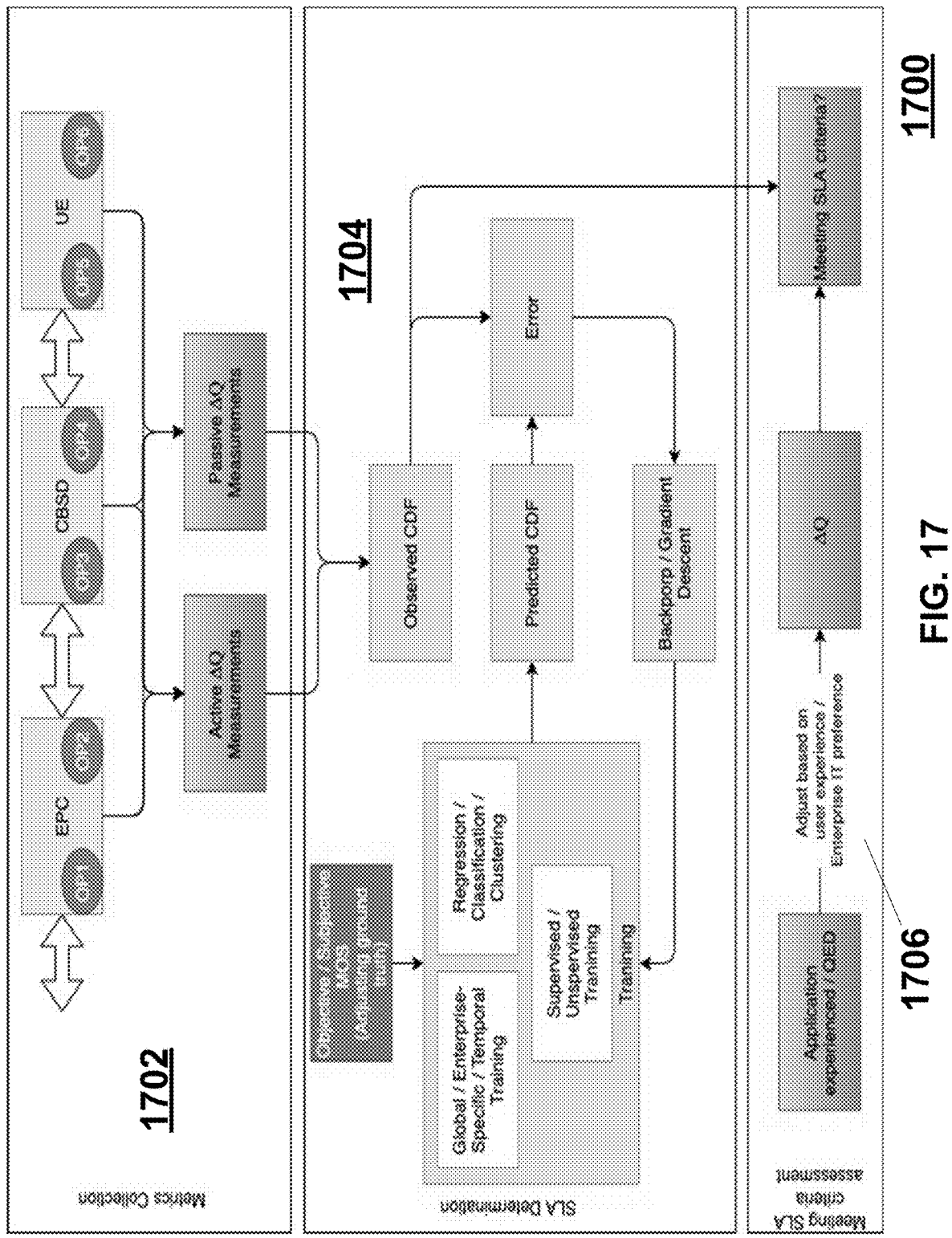
FIG. 17 shows the Metric Collection system of FIG. 16 combined with a SLA determination flowchart and system and a flowchart.

FIG. 17 shows the Metric Collection system 1702 of FIG. 10 is combined with a SLA Determination flowchart and system and a flowchart 1704 for assessing whether the SLA criteria is being met. The metrics collection segment of the system 1702 of FIG. 17 is identical to that shown in FIG. 16 and outputs both active ΔQ and passive ΔQ Measurements. These measurements are provided as input to the SLA Determination flowcharts and system 1704 whereat an SLA Determination is made. In order to make a ΔQ Realization, the system determines ΔG. Collected Packet delay is associated with packet sizes. Assess ΔS and ΔV looking at the individual packet size groups and as a joint distribution. The required SLA is determined based on the assessment made by the system 1700 of FIG. 17.

The flowchart of processes shown in FIG. 17 can now be described in more detail. As shown in FIG. 17, the flowchart and processes comprise an EPC Core, a CBSD (or more simply, an Access Point (AP)), and a UE. Each of these components/processes include Observation Points (or "OPs"), such as the EPC OP and the EPC OP, the CBSD OP and CBSD OP, the UE OP and UE OP. The various Observation Points observe and measure specified metrics for their respective component/process. More specifically, the EPC OPs measure metrics for the EPC Core, the CBSD OPs measure metrics for the CBSD, and the UE OPs measure metrics for their associated UE. Packet transmission metrics can be observed by the various OPs and provided as input to the other processes shown in FIG. 17. As is also shown in FIG. 17, both active ΔQ and passive ΔQ measurements are provided by the ΔQ Measurement processes and, respectively. These active and passive ΔQ measurements are provided as input to the Observed CDF process 412. In accordance with the present method and apparatus, the Observed CDF is compared to a Predicted CDF 414, and the differences between the observed and predicted CDFs are recorded as "errors" in the error process.

Any and all deviations between the observed CDF and the predicted CDF result in "errors". These errors, or deviations, are fed back by the Error process 416 to a "Backporp/Gradient Descent" process, which is then fed back as input to a Training process. The feedback architecture causes the Training process 420 to update the Predicted CDF 414 accordingly. As those skilled in the artificial intelligence and machine learning arts will appreciate, a machine learning technique is used to apply the Backporp/Gradient Descent process to update the Predicted CDF. The ultimate goal is to continually update the Predicted CDF so that it eventually gets closer and closer to the Observed CDF, and eventually "mimics" the Observed CDF. We wish to improve the CDF accordingly. The Application Experienced/QED process 1706 is adjusted based on user experience and Enterprise IT preference. This is then compared to the ΔQ in process and these results are used to determine whether the SLA criteria is being met or not. This SLA criteria determination is made at the SLA criteria process. As long as the predicted CDF does not stray too far from the observed CDF, the disclosed method and apparatus should properly meet the expected SLA criteria.

Observable Phenomenon using Quality Attenuation—The observable phenomenon using Quality Attenuation include Packet processing at EPC, CBSDs, and Frequencies. This includes re-routing, Load balancing and Packet fragmentation.

CPU utilization is also an observable phenomenon. A CPE processor maxed out & impact of WiFi scanning "distracting" from packet processing. The RAN scheduler is observable: Misconfigured schedulers (queue saturation & buffer bloat, etc.). QoS benefits/differentiation under congestion may be observed.

Congested/Maxed out transmission links are similarly observable.

Benefits of technology & architecture upgrades may help improve network performance.

Capacity utilization of the 5G, 4G, and Wi-Fi networks may be improved.

Using the present methods and apparatus improve the Quality of Experience Delivered ("QED") for use in Private Enterprise networks, avoids basing the assessment of network performance on a single primary metric (typically "delay"). It has been seen that the "delay" measurement inherently reflects the performance seen with the other metrics such as PER, throughput, and potentially even jitter. Dividing the assessment based on packet sizes groups rather than as an aggregate for better understanding of the tunability of the application layer for improved service. The burstiness of the traffic may be gauged, thereby allowing for improved scheduling in the RAN—derived from the queue build-up and associating it with the packet sizes of the service.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of improving "Quality of Experience Delivered" ("QED") in a Private Enterprise network, comprising:
   a) using a QED Framework to map network quality to Quality of Service (QoS) requirement;
   b) measuring Quality Attenuation over different hops in the private enterprise network; and
   c) decomposing the Quality Attenuation for a round trip into separate constituent components corresponding to various sources of performance degradation to determine hop-to-hop performance, assess end-to-end system performance and resolve bottlenecks in the Private Enterprise Network.

* * * * *